(12) United States Patent
Lynds

(10) Patent No.: US 11,482,878 B2
(45) Date of Patent: Oct. 25, 2022

(54) PARALLEL STRING VOLTAGE SUPPORT

(71) Applicant: UCAP Power, Inc., San Diego, CA (US)

(72) Inventor: Robert Shaw Lynds, La Mesa, CA (US)

(73) Assignee: UCAP Power, Inc., San Diego, CA (US)

( * ) Notice: Subject to any disclaimer, the term of this patent is extended or adjusted under 35 U.S.C. 154(b) by 0 days.

(21) Appl. No.: 15/481,804

(22) Filed: Apr. 7, 2017

(65) Prior Publication Data

US 2017/0302094 A1 Oct. 19, 2017

Related U.S. Application Data

(60) Provisional application No. 62/323,286, filed on Apr. 15, 2016.

(51) Int. Cl.
| | |
|---|---|
| H02J 7/00 | (2006.01) |
| H02J 7/34 | (2006.01) |
| B60L 3/00 | (2019.01) |
| B60L 58/19 | (2019.01) |
| B60L 50/40 | (2019.01) |
| B60L 58/14 | (2019.01) |
| H02M 3/07 | (2006.01) |

(52) U.S. Cl.
CPC ............ *H02J 7/345* (2013.01); *B60L 3/0046* (2013.01); *B60L 50/40* (2019.02); *B60L 58/14* (2019.02); *B60L 58/19* (2019.02); *H02J 7/0024* (2013.01); *H02J 7/0034* (2013.01); *H02J 7/0063* (2013.01); *H02J 7/0068* (2013.01); *B60L 2250/26* (2013.01); *H02M 3/07* (2013.01); *Y02T 10/70* (2013.01)

(58) Field of Classification Search
CPC .. H02J 7/0065; H02J 7/34; H02J 7/345; H02J 7/0034; H02J 7/0068; B60L 3/0046
USPC ............ 307/71, 112, 116, 125, 130; 320/117
See application file for complete search history.

(56) References Cited

U.S. PATENT DOCUMENTS

| | | | | |
|---|---|---|---|---|
| 5,519,557 A | * | 5/1996 | Kopera, Jr. .......... | H02H 11/003 361/77 |
| 5,726,505 A | * | 3/1998 | Yamada ............ | H01L 31/02021 307/127 |
| 5,828,560 A | * | 10/1998 | Alderman ............... | H02M 3/07 363/60 |
| 5,960,898 A | * | 10/1999 | Okada ................... | B60L 11/005 180/65.8 |
| 6,100,665 A | * | 8/2000 | Alderman ........... | H01M 6/5033 320/127 |

(Continued)

FOREIGN PATENT DOCUMENTS

| | | |
|---|---|---|
| EP | 2736146 | 5/2014 |
| WO | WO 2013/138380 | 9/2013 |

*Primary Examiner* — Adi Amrany
(74) *Attorney, Agent, or Firm* — Knobbe Martens Olson & Bear, LLP

(57) ABSTRACT

This disclosure provides systems, methods and apparatus for an energy storage system. In one aspect, the energy storage system includes a controller configured to connect a first capacitor system and a second capacitor system in series with an output of a battery system during a high current demand event such that the voltage of the output of the battery system is supported within the voltage constraints of the output of that battery system.

17 Claims, 8 Drawing Sheets

(56) References Cited

U.S. PATENT DOCUMENTS

| | | | |
|---|---|---|---|
| 6,307,350 B1* | 10/2001 | Alderman | H01M 10/425 320/116 |
| 7,084,864 B1* | 8/2006 | Wood | H05B 41/16 307/110 |
| 7,119,518 B1* | 10/2006 | Dougherty | G01R 31/3631 320/117 |
| 7,560,904 B2 | 7/2009 | Alzarez-Troncoso | |
| 7,667,438 B2 | 2/2010 | Ashtiani et al. | |
| 7,839,105 B2* | 11/2010 | Yang | H01H 47/18 318/362 |
| 7,898,223 B2* | 3/2011 | Takeda | H02M 3/07 320/117 |
| 8,525,487 B1* | 9/2013 | Stevenson | H02J 7/0065 307/109 |
| 9,729,055 B1* | 8/2017 | Yao | H02M 3/158 |
| 2002/0024784 A1* | 2/2002 | Pinto de Oliveira | H02H 11/002 361/91.6 |
| 2005/0110468 A1 | 5/2005 | Turner et al. | |
| 2006/0006850 A1* | 1/2006 | Inoue | H02J 7/007182 323/265 |
| 2007/0132313 A1 | 6/2007 | Baeuerle | |
| 2008/0246443 A1 | 10/2008 | Doljack | |
| 2008/0315829 A1 | 12/2008 | Jones et al. | |
| 2009/0039813 A1* | 2/2009 | Yamada | H02P 21/34 318/434 |
| 2012/0217811 A1* | 8/2012 | Marien | H02M 3/158 307/71 |
| 2013/0049459 A1* | 2/2013 | Hatanaka | G05F 1/573 307/10.1 |
| 2013/0147543 A1* | 6/2013 | Dai | H02M 3/07 327/536 |

* cited by examiner

US 11,482,878 B2

PARALLEL STRING VOLTAGE SUPPORT

RELATED APPLICATIONS

The present Application for Patent claims priority to Provisional Application No. 62/323,286 entitled "PARALLEL STRING VOLTAGE SUPPORT," filed Apr. 15, 2016, which is assigned to the assignee hereof and which is incorporated by reference herein in its entirety.

BACKGROUND

Field

The present disclosure relates generally to systems and methods for providing voltage support for the output of an energy storage system. In particular, the systems and methods use an energy storage system that provides greater power performance, such as a capacitor system, in combination with an energy storage system that provides greater energy performance, such as a battery.

Description of the Related Art

Different mechanisms for combining an energy storage system, such as a battery, and a capacitor system exist in order to meet output voltage requirement windows. However, conventional systems do not provide efficient mechanisms for combining battery system and capacitor systems without adding complicated circuitry which leads to expense and reduced reliability in an electrical system.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for providing voltage support for an output of a battery system. The apparatus includes: a first branch comprising a first capacitor system and a first charging circuit; a second branch comprising a second capacitor system and a second charging circuit, wherein the first and second branches are connected in parallel with one another and configured to both be connected in parallel with an output of a battery system; and a controller configured to connect a positive terminal of the first capacitor system to a negative terminal of the second capacitor system when a voltage of the output of the battery system is at or below a first voltage threshold.

In one aspect, the controller is further configured to disconnect the battery system from the output when the controller connects the first and second capacitor systems.

In another aspect, the controller is further configured to disconnect the first capacitor system from the first charging circuit when a voltage of the first capacitor system is at or near a first target voltage and the controller is further configured to disconnect the second capacitor system from the second charging circuit when a voltage of second capacitor system is at or near a second target voltage.

In some embodiments, the first target voltage, the second target voltage and the first threshold voltage are approximately the same.

In another aspect, the controller is further configured to disconnect the battery system from the output when the controller connects the first and second capacitor systems.

In another aspect, the first threshold voltage is approximately a maximum discharge voltage threshold of the battery system.

In some embodiments, the first and second target voltages are each approximately half of a maximum voltage desired at the output.

In some embodiments, the apparatus further includes a current blocking circuit configured to block a reverse current from the second capacitor system to the battery system.

In some embodiments, the current blocking circuit includes a diode.

In one aspect, the first charging circuit includes a first resistor and the second charging circuit includes a second resistor.

Another innovative aspect of the subject matter described in this disclosure can be implemented in a method of providing voltage support for an output of a battery system. The method includes: connecting a first branch in parallel with a second branch, wherein the first branch comprises a first capacitor system and a first charging circuit, and the second branch comprises a second capacitor system and a second charging circuit; connecting the first branch and the second branch in parallel with an output of a battery system; and connecting a positive terminal of the first capacitor system to a negative terminal of the second capacitor system when a voltage of the output of the battery system is at or below a first voltage threshold.

In some embodiments, the method further includes disconnecting the battery system from the output when the controller connects the first and second capacitor systems.

In some embodiments, the method further includes disconnecting the first capacitor system from the first charging circuit when a voltage of the first capacitor system is at or near a first target voltage; and disconnecting the second capacitor system from the second charging circuit when a voltage of the second capacitor system is at or near a second target voltage.

In some aspects, the first target voltage, the second target voltage, and the first threshold voltage are approximately the same.

In some embodiments, the method further includes disconnecting the battery system from the output when the controller connects the first and second capacitor systems.

In some embodiments, the first threshold voltage is approximately a maximum discharge voltage threshold of the battery system.

In some aspects, the first and second target voltages are each approximately half of a maximum voltage desired at the output.

In some embodiments, the method further includes blocking a reverse current from the second capacitor system to the battery system.

Another innovative aspect of the subject matter described in this disclosure can be implemented in an apparatus for providing voltage support for an output of a battery system. The apparatus includes a first capacitor system; a second capacitor system; a first charging circuit connected between an output of a battery system and a positive terminal of the first capacitor system; a second charging circuit connected to a negative terminal of the second capacitor system; a first switch connected between the positive terminal of the first capacitor system and the negative terminal of the second capacitor system; and a controller configured to close the first switch when a voltage of the output of the battery system is at or below a first voltage threshold.

In some aspects, the apparatus further includes a second switch connected between the positive terminal of the first capacitor system and the first charging circuit; a third switch connected between the negative terminal of the second capacitor system and the second charging circuit; and wherein the controller is further configured to close the first switch and open the second and third switches when the voltage of the output of the battery system is at or below a first voltage threshold.

In one aspect, the apparatus further includes a fourth switch between the output of the battery system and a positive terminal of the second capacitor system wherein the controller is further configured to open the fourth switch when the voltage of the output of the battery system is at or below a first voltage threshold.

In one aspect, the apparatus further includes a current blocking circuit comprising an anode and a cathode wherein the anode of the current blocking circuit is connected to the output of the battery system and the cathode of the current blocking circuit is connected to a positive terminal of the second capacitor system.

In some embodiments, the apparatus further includes a fourth switch connected between the cathode of the current blocking circuit and the anode of the current blocking circuit wherein the controller is further configured to open the fourth switch when the voltage of the output of the battery system is at or below a first voltage threshold.

In some embodiments, the first and second charging circuits comprise resistors.

In some embodiments, the current blocking circuit comprises a diode.

Details of one or more implementations of the subject matter described in this disclosure are set forth in the accompanying drawings and the description below. Although the examples provided in this disclosure are sometimes described in terms of vehicles, such as hybrid vehicle systems, the concepts provided herein may apply to other types of systems with or within which an energy storage system is implemented. Other features, aspects, and advantages will become apparent from the description, the drawings and the claims. Note that the relative dimensions of the following figures may not be drawn to scale.

Figure 1:
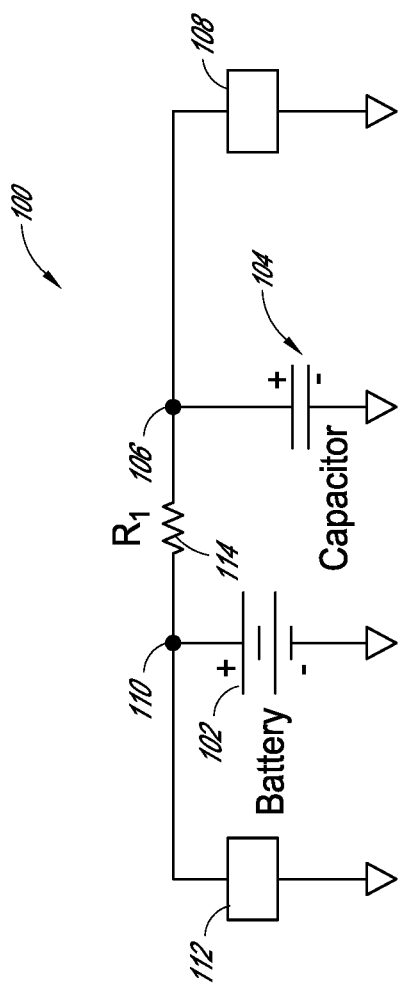
FIG. 1 shows a schematic view of an energy storage system according to an embodiment.

The various features illustrated in the drawings may not be drawn to scale. Accordingly, the dimensions of the various features may be arbitrarily expanded or reduced for clarity. In addition, some of the drawings may not depict all of the components of a given system, method or device Like reference numbers and designations in the various drawings indicate like elements.

DESCRIPTION

Energy storage systems, for example batteries, relying on chemical reactions to generate energy may not be efficient when sudden and sharp current demands are placed on their output. For example, when a driver of a hybrid vehicle suddenly depresses the accelerator placing a sudden and sharp demand for energy or current on the energy storage system, the system may experience a significant and sudden drop in the output voltage. Such a sudden and significant drop in output voltage can be problematic in several respects.

Battery systems providing energy and energy storage for an electrical system may have their own voltage tolerance windows. For example, battery systems may sustain damage resulting in reduced performance or failure if allowed to discharge to or below a discharge voltage threshold. Battery systems can also sustain damage resulting in reduced performance or failure, if allowed to charge to or above a charge voltage threshold. In addition, often battery systems may be limited in their capacity to accept charge, due to their internal resistance. Thus, the charge voltage threshold of these battery systems is often limited to a value close to their nominal open circuit voltage. Additionally, battery systems can be limited in their ability to rapidly discharge, due to their internal resistance.

Additionally, the output node of energy storage systems may be connected to electrical systems which may have their own voltage tolerance windows, such as a minimum operating voltage threshold below which these electronics may not function properly. For example in automotive applications, desired operating voltages can be between 10 V to 16 V when a 12 V battery is utilized. Additionally, the electrical systems to which the output of a battery system may be connected sometimes generate currents or demand currents from the battery system that pushes the voltage of the output of the battery system outside of its tolerance window.

Combining an alternative energy storage system, such as a capacitor or an ultracapacitor, with a battery system can help maintain the voltage of the output node of an energy storage system within acceptable constraints. For example, a capacitor system can be previously charged and when needed quickly discharge and efficiently meet sudden and sharp current demands in the output of a battery system, thereby providing voltage support to the battery system. The capacitor system can be selectively charged to a predetermined target or threshold capacitor voltage such that the capacitor system can provide voltage support without increasing the output voltage of the energy storage system to a value higher than the tolerance of the battery system, and/or of the components(s) of the electrical system connected to the output node.

In the present disclosure, the terms battery and battery system may be used interchangeably to generally describe a single battery, or a combination of multiple batteries. Similarly, the terms capacitor and capacitor system may be used interchangeably to mean a single capacitor, ultracapacitor, multiple capacitors, ultracapacitors, capacitor system or any combinations thereof.

Various embodiments of energy storage systems that use a combination of a battery system and a capacitor system follow.

FIG. 1 shows a schematic view of an energy storage system 100 according to an embodiment. The energy storage system 100 can include a capacitor system 104 configured in a parallel branch with a battery system 102 and a load 108. The energy storage system 100 can include a charging circuit 114 connected between the positive terminal of the capacitor system 104 and a battery terminal 110. In some embodiments, the charging circuit 114 can include a transistor. Alternative devices can also be used. The positive terminal of the battery system 102 can be connected to the charging circuit 114. The load 108 can be connected to the output node 106. The energy storage system 100 can include a power supply 112 through which electrical energy can be delivered to the battery system 102 or the capacitor system 104 via the node 110. The power supply 112, the battery 102, and/or the load 108 can be an integral part of, or also can be external to the energy storage system 100. In automotive applications, the power supply 112 can include a vehicle's alternator/generator or like components.

In some embodiments, the capacitor system 104 can be charged approximately to the output voltage of the battery system 102. The capacitor system 104 can be charged by the battery system 102 or the power supply 112 or both. When a period of high current/voltage demand occurs, for example, by load 108, the voltage of the capacitor system 104 starts to decay from its initial battery output voltage value. As such, the capacitor system 104 discharges current into the output node 106 and into the load 108, providing voltage support for the output node 106.

The charging circuit 114 can include a resistor R1 positioned between the capacitor system 104 and the node 110, as shown. The resistor R1 can comprise a resistor or other suitable electrical component selected to provide a specific additional resistance value greater than a simple, lower resistance wired electrical connection. The capacitor system 104 and the resistor $R_1$ can be chosen such that the capacitor system 104 has a time constant two or more times larger than the period of demand from the load 108 and in some embodiments two or more times smaller than the recovery period between loads. For example, in an automotive application with a requirement for a three-second crank every 30 seconds, and a capacitor of 500 F, a resistance of approximately 20 milliohm (mΩ) can be used to produce a time constant of approximately 10 seconds, which is three times larger than the crank time and three times smaller than the recovery time. The capacitor system 104 can provide voltage support as described above when the battery system 102 is unable to provide the needed voltage at the output node 106, and/or to prevent the voltage of the battery system 102 from dropping below a discharge threshold.

A direct parallel system such as that shown in FIG. 1 may only allow the capacitor system 104 to be charged up to the voltage of the battery system 102. For example, in a 12 Volt (V) system, where the output node 106 can tolerate voltage swings between 10 V to 14 V, the direct parallel arrangement is not able to utilize the 2 V tolerance window of 12 V to 14 V since the capacitor system 104 was only charged to the battery voltage of 12 V. Nevertheless, the direct parallel arrangement may be adequate in certain applications, for example applications where the time constant of the capacitor system 104 and resistor $R_1$ is relatively larger than the period of high demand from the load 108.

Figure 2:
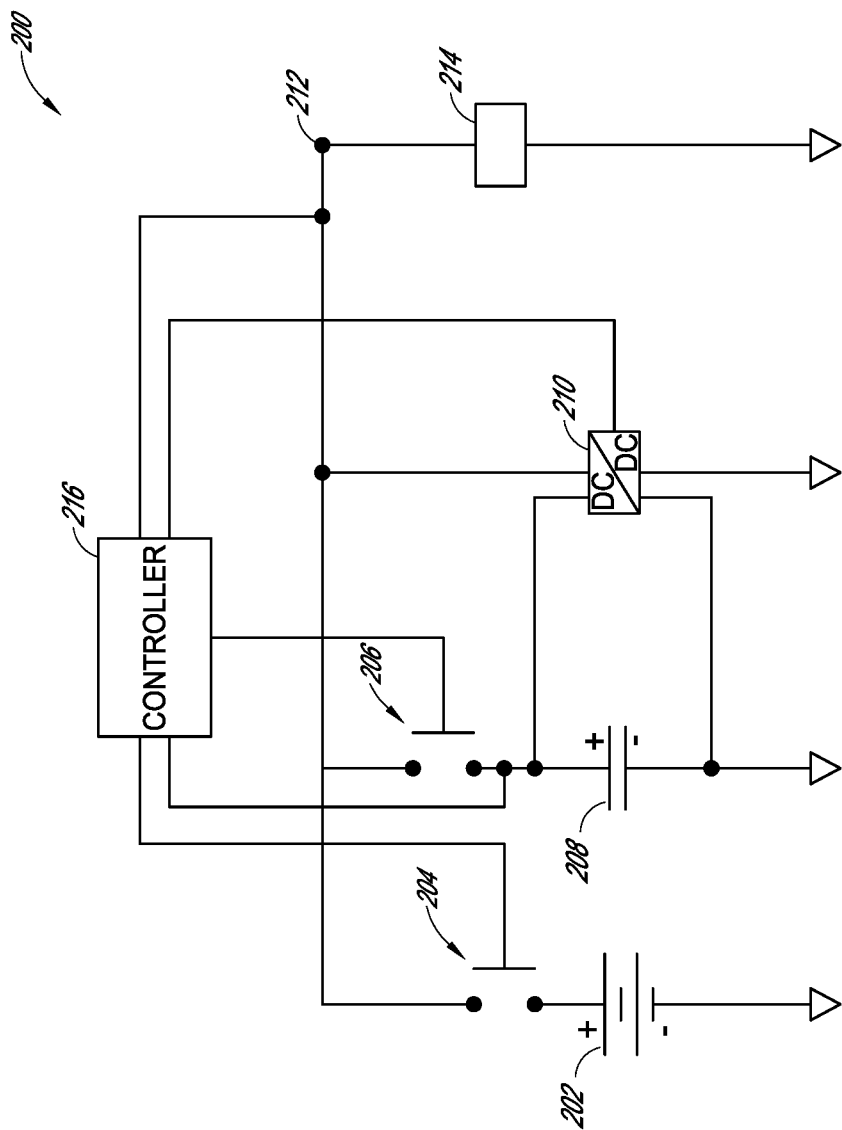
FIG. 2 shows a schematic view of an energy storage system according to an embodiment.

FIG. 2 shows a schematic view of an energy storage system 200 according to an embodiment. The energy storage system 200 can include a battery system 202 and a capacitor system 208 connected in parallel branches with a load 214. The system 200 can include a power supply 220. The system 200 can include one or more additional components, such as relay switches 204 and 206, and or a DC/DC converter 210, to provide additional functionality to the combination of the battery system 202 and the capacitor system 208. The power supply 220, battery 202, and/or load 214 can be an integral part of, or an external component to the energy storage system 200.

The energy storage system 200 can include a controller 216. Controller 216 can be configured to detect various voltages in the system including for example, a voltage at an output node 212 and a voltage of the capacitor system 208. The controller 216 can be further configured to control the relay switches 204, 206 and/or the DC to DC converter 210. As shown, the DC/DC converter 210 can be connected to the positive and negative terminals of the capacitor system 208 respectively to control the voltage across the capacitor system 208 in response to commands from the controller 216. The switch 204 can selectively connect the positive terminal of the battery system 202 to the output node 212. The switch 206 can selectively connect the capacitor system 208 to the output node 212. As with the embodiment shown in FIG. 1, the power supply 220 can provide electrical energy to the battery system 202, the capacitor system 208 and/or the output node 212 via the node 218. In some embodiments, the node 218 can be at the same voltage potential as the output node 212. In automotive applications, the power supply 220 can include a vehicle's alternator/generator or like components.

The capacitor system 208 can be charged through the DC to DC converter 210 to a desired voltage, including voltages above the battery voltage, depending on the voltage tolerance windows of the system at the output node 212. The controller 216 can be configured to selectively open or close the relay switches 204 and 206 selectively connecting and disconnecting the output node 212 to the battery system 202, the capacitor system 204 or both. The controller 216 can open the switch 204 and close the switch 206 and provide the power of the power supply 220 via the node 218 to the capacitor system 208. The controller 216 using the DC to DC converter 210 can control the voltage to which the capacitor 208 is charged. For example, the capacitor system 208 can be charged to a voltage above the voltage of the battery system 202. The controller 216 can also close the switch 204 and open the switch 206 and provide electrical energy from the power supply 220 via the node 218 to the battery system 202. When a period of high current/voltage demand at the output node 212 occurs, for example high current/voltage demand from the load 214, the controller 216 can close the switch 206 providing the energy stored in the capacitor system 208 through the output node 212 to the load 214.

An embodiment with switches and a DC/DC converter, such as that shown in FIG. 2, may require close control of the timing of the relay switches 204 and 206. If, for example, both switches 204 and 206 are simultaneously open at a time when there is a load demand on the output node 212, the load 214 might experience a critical loss of power since neither the battery system 202 nor the capacitor system 208 are connected to the output node 212. In an automotive application, such a loss of power is unacceptable. Conversely, if both switches 204 and 206 are closed, the load 214 might experience a surge in power from both the battery system 202 and the capacitor system 208 beyond the capability of the load 214 to absorb energy, causing damage to the load 214.

Figure 3:
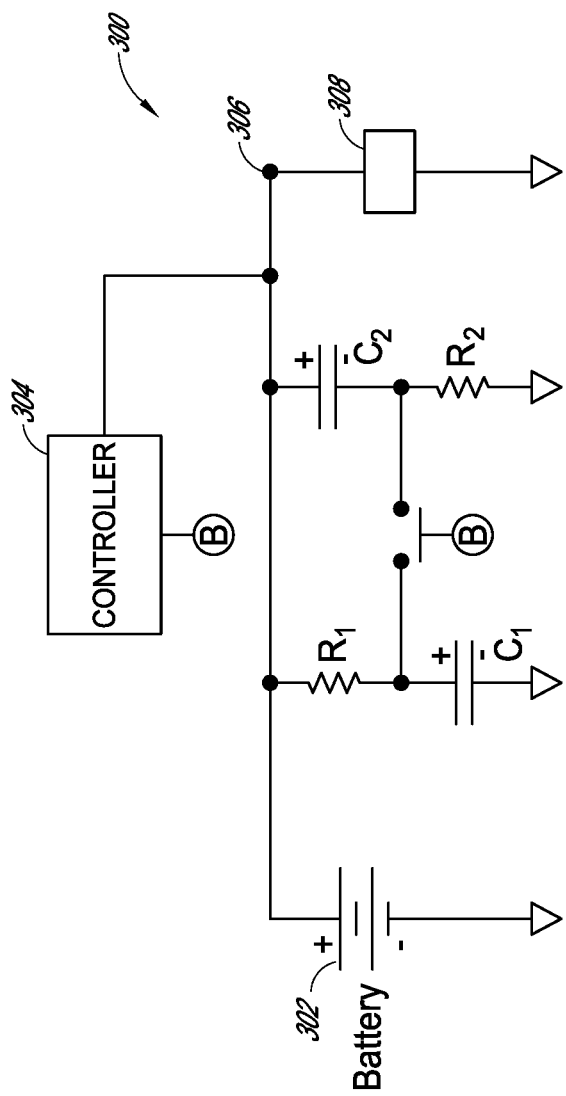
FIG. 3 shows a schematic view of an energy storage system according to an embodiment.

FIG. 3 shows a schematic view of an energy storage system 300, in accordance with an embodiment. The energy storage system 300 can address some of the limitations identified above while providing efficient voltage support. The energy storage system 300 can include a battery system 302, a first charging circuit 310, a second charging circuit 312, a first capacitor system $C_1$, a second capacitor system $C_2$, a switch B and a controller 304. A power supply 316 and external load 308 can be implemented. The power supply 316 can provide electrical energy to the battery system 302 and/or the capacitor systems $C_1$ and $C_2$ through a node 314. The battery system 302 can also provide electrical energy to the first and second capacitor systems $C_1$ and $C_2$. The first and second charging circuits 310 and 312 can for example include resistors R1 and R2, respectively. The power supply 316, external load 308, and/or battery system 302 can be part of the energy storage system 300, or external component(s).

The positive terminal of the battery system 302 can be connected to the node 314 which can be at the same voltage potential as the output node 306. The capacitor systems $C_1$ and $C_2$ can be connected in parallel branches to the output node 306, as follows: the first charging circuit 310 can connect the positive terminal of the first capacitor system $C_1$ to the output node 306. The second charging circuit 312 can connect the negative terminal of the second capacitor system $C_2$ to the ground, with the positive terminal of the second capacitor system $C_2$ connected to the output node 306. The switch B can selectively connect the positive terminal of the first capacitor system $C_1$ to the negative terminal of the second capacitor system $C_2$ in response to the commands from the controller 304.

When the switch B is open, the first and second capacitor systems $C_1$ and $C_2$ are connected in parallel branches with respect to each other and configured to both be connected in parallel branches with the battery system 302. When the switch B is closed, the first and second capacitor systems $C_1$ and $C_2$ are connected effectively in series with each other because the combined voltages of both the first capacitor system $C_1$ and the second capacitor system $C_2$ contribute to the output node 306.

The energy storage system 300 can operate in two modes. The controller 304 can be configured to detect the voltage or current demands of the output node 306 in order to determine which mode of operation the energy storage system 300 should be placed in. Additionally, while not shown, the controller 304 can be configured to detect voltages or current demands in other parts of the energy storage system 300. For example, the controller 304 can be configured to detect voltages of the battery system 302, and/or the first and second capacitor systems $C_1$ and $C_2$. The controller 304 can also be configured to control the operations of the switch B in order to place the energy storage system 300 in mode 1 or mode 2 depending on the voltage and current demands of the output node 306.

In mode 1, or normal operation mode, the controller 304 opens the switch B, as described above, such that the first and second capacitor systems $C_1$ and $C_2$ can each be charged up to the voltage of the battery system 302, $V_B$. The controller 304 may move the system to mode 2, or voltage support mode, when a current demand event occurs at load 308. For example, a current demand event may occur when the driver of the hybrid vehicle to which the energy storage system 300 is connected depresses the accelerator. In mode 2, the controller 304 closes the switch B, which connects the first and second capacitor systems $C_1$ and $C_2$ effectively in series to the output node 306, as described above. The first and second capacitor systems $C_1$ and $C_2$, as mentioned above, have each been charged to the battery voltage $V_B$ during mode 1. Thus, when the switch B is closed in mode 2, the first and second capacitor systems $C_1$ and $C_2$ can together deliver approximately $2V_B$ to the output node 306 and into the load 308. Thus, the system 300 can provide voltage support from the first and second capacitor systems $C_1$ and $C_2$ to the battery system 302 at voltages greater than battery voltage $V_B$.

The controller 304 can be configured to transition the energy storage system 300 from mode 1 to mode 2 in response to a condition, such as when the voltage of the output of the battery system or output node 306 is at or below a voltage threshold, and/or in response to a sudden current demand. For example, in a 12V system in automotive applications, the controller 304 may activate mode 2 if the voltage of the output node is at or below 10V, or any other voltage below which the load 308 cannot function properly or has reduced performance.

Due to common node 314 of the capacitors systems $C_1$ and $C_2$ with the battery 302, some of the charge stored in the first and second capacitor systems $C_1$ and $C_2$ may be delivered to the battery system 302, and thus charge battery 302, instead of providing voltage to the output node 306. However, if the internal resistance of the battery system 302 is high, relative to that of the capacitors, as is generally the case, then much of the charge stored in the first and second capacitor systems $C_1$ and $C_2$ can be delivered to the output node 306 in mode 2 as opposed to leaking back and charging the battery system 302. Additionally, a certain amount of leakage might be acceptable in some applications. For example, in some applications, the first and second capacitor systems $C_1$ and $C_2$ might be able to provide only 100 Amps (A) when the output node 306 is taken to 16 V. During mode 2, the internal resistance of the battery 302 might be such that the battery system 302 absorbs 10 A from the first and second capacitor systems $C_1$ and $C_2$. In these applications, if losing 10 A of charge during mode 2 is acceptable, the energy storage system 300 may be used effectively.

Figure 4:
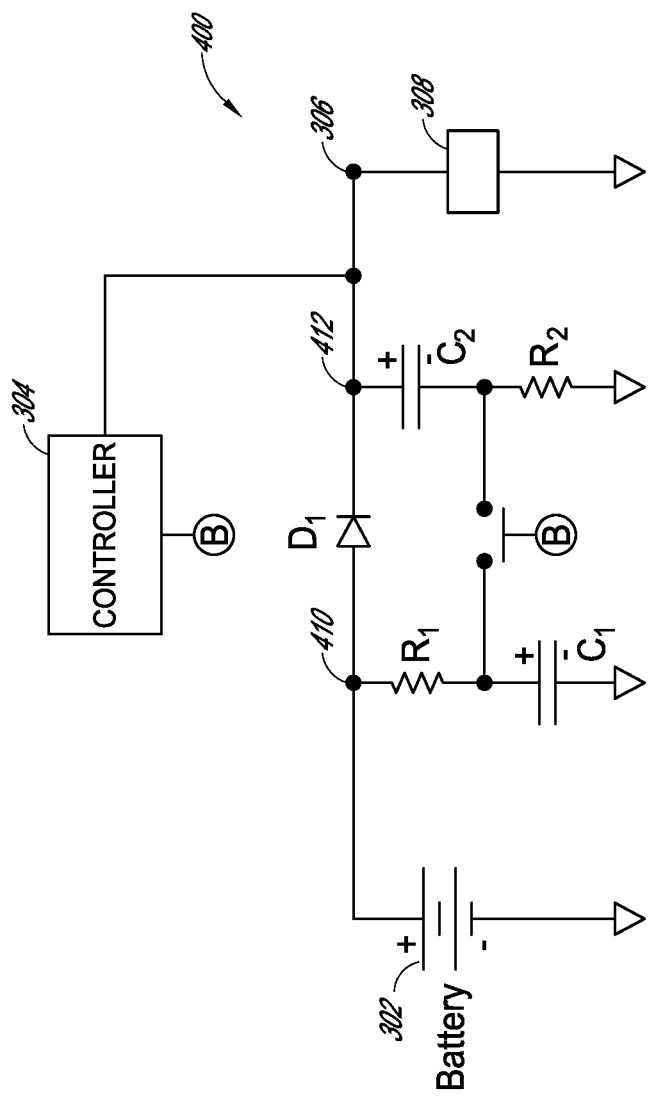
FIG. 4 shows a schematic view of an energy storage system according to an embodiment

FIG. 4 shows a schematic view of an energy storage system 400, in accordance with an embodiment. The energy storage system 400 can be substantially similar to the energy storage system 300 of FIG. 3. A difference is that system 400 includes a current blocking circuit, for example a diode $D_1$, connected between the branches of the first and second capacitor systems $C_1$ and $C_2$. For example, system 400 includes a node 410 connected to an end of R1 and common to node 314, and a node 412 connected to the positive terminal of $C_2$ and common to node 306, with the diode $D_1$ positioned between the nodes 410 and 412. The diode $D_1$ can be utilized to reduce, or block current flowing from the capacitor systems $C_1$ and $C_2$ to the battery 302. Thus, diode $D_1$ can reduce or prevent the loss of electrical energy charge to the battery system 302 in mode 2, as described above with reference to system 300 in FIG. 3. Embodiments that implement $D_1$ will incur a diode voltage drop across the diode $D_1$.

Figure 5:
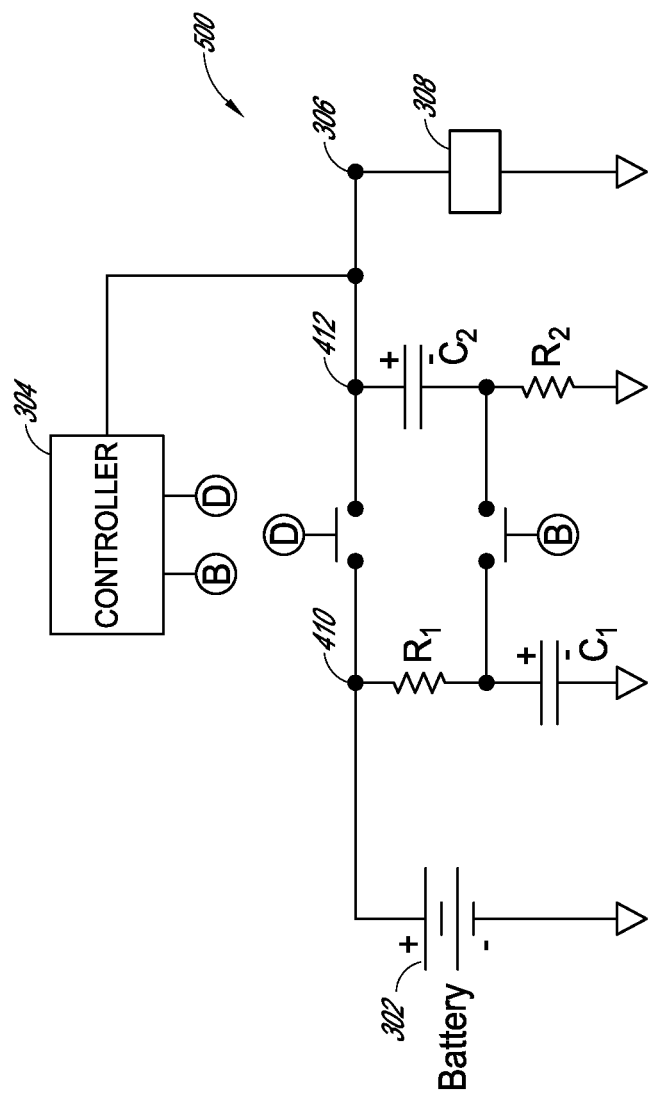
FIG. 5 shows a schematic view of an energy storage system according to an embodiment.

FIG. 5 shows a schematic view of an energy storage system 500, in accordance with an embodiment. The energy storage system 500 can be substantially similar to the energy storage systems 300 and 400 of FIGS. 3 and 4, respectively. A difference is that system 500 includes a switch D positioned between nodes 410 and 412. Switch D can prevent or reduce current leaking to the battery system 302 in mode 2, similar to the diode $D_1$ described above with reference to system 400 in FIG. 4. Switch D can also avoid the aforementioned voltage drop across the diode $D_1$ between the battery system 302 and the load 308.

The controller 604 can be configured to open the switch D when the switch B is closed and the energy storage system 300 is in mode 2 or voltage support. If the currents through the first and second charging circuits 310 and 312 are small, when the switch D is open and the switch B is closed, the first and second capacitor systems $C_1$ and $C_2$ are effectively connected in series to the output node 306. In this scenario, the controller 304 can disconnect the battery system 302 from the output node 306 when the controller connects the first and second capacitor systems in series to the output node 306. In such an embodiment, leakage of charge during mode 2 from node 412 is prevented, and resistor $R_1$ prevents leakage from the positive terminal of capacitor $C_1$.

Figure 6:
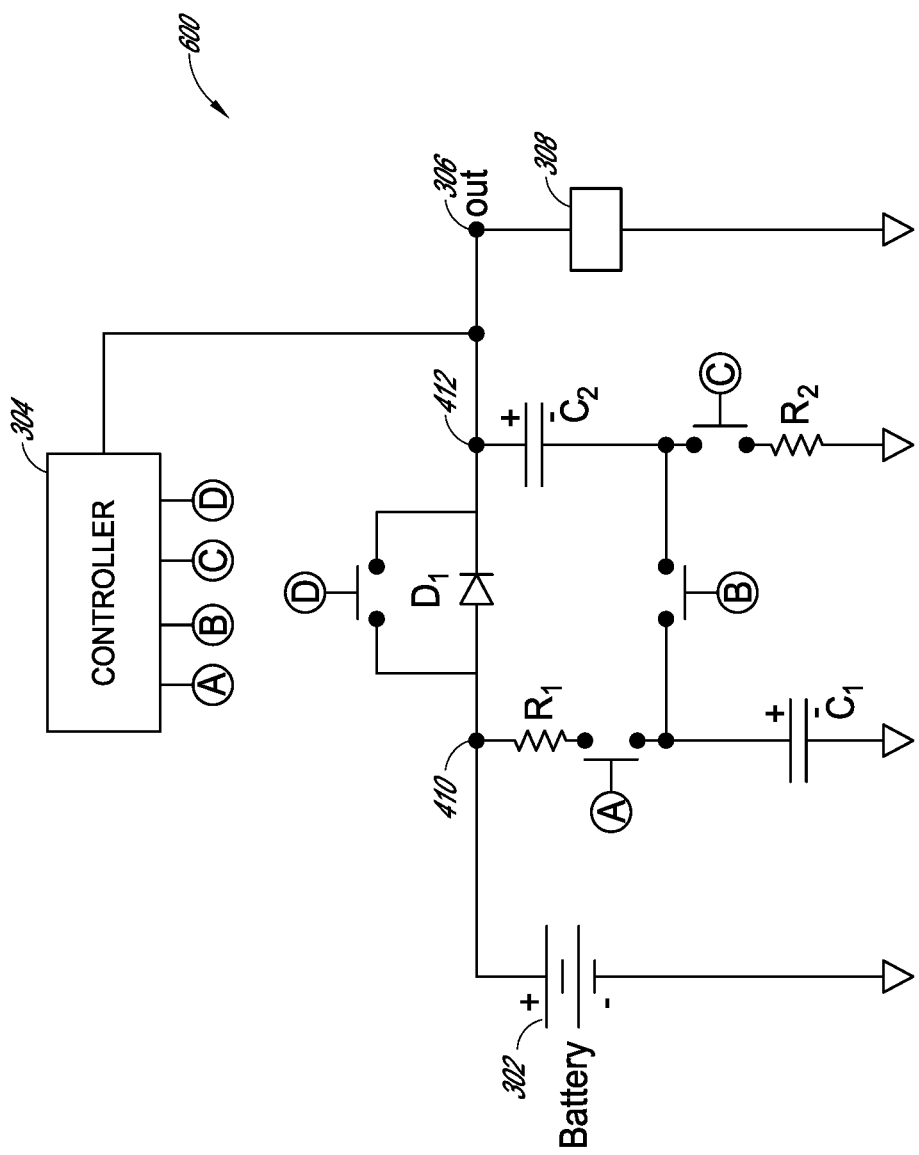
FIG. 6 shows a schematic view of an energy storage system according to an embodiment.

FIG. 6 shows a schematic view of an energy storage system 600, in accordance with an embodiment. The energy storage system 600 can be substantially similar to the energy storage systems 300, 400, and 500 of FIGS. 3, 4 and 5, respectively. The system 600 can include both the diode $D_1$ and the switch D, positioned in parallel with respect to each other, between the nodes 410 and 412. During mode 1 or normal operation, the switch D is closed and hence the diode $D_1$ is short-circuited and the aforementioned voltage drop due to the diode $D_1$ is reduced or eliminated. During mode 2 or voltage support, the switch D is open. The diode $D_1$ blocks current leaking back from the first and second capacitor systems $C_1$ and $C_2$ to the battery 302 during the transition of the switch D between an open and closed position.

The energy storage system 600 can include two additional switches A and C to control the charge and discharge of the first and second capacitor systems $C_1$ and $C_2$. Switch A is positioned between the positive terminal of the first capacitor system $C_1$ and the first charging circuit 310. Switch C is positioned between the negative terminal of the second capacitor system $C_2$ and the second charging circuit 312.

In mode 1 or normal operation, the switches A, C and D are closed, and the switch B is open, to allow the first and second capacitor systems $C_1$ and $C_2$ to charge. If resistors $R_1$ and $R_2$ are used for the first and second charging circuits 310 and 312 respectively, the resistors $R_1$ and $R_2$ can be configured to have a large enough resistance such that the capacitors $C_1$ and $C_2$ do not contribute significantly to the output node 306 in mode 1. In mode 2, the switches A, C and D are opened, and the switch B is closed, to allow the first and second capacitor systems $C_1$ and $C_2$ to provide voltage support to the output node 306 and load 308.

For example, in a 12 V battery system, during mode 1, the first and second capacitor systems $C_1$ and $C_2$ will each charge by default to a default capacitor output voltage of approximately the battery system 312 voltage, or here, 12 V. In this scenario, during mode 2 or voltage support, the voltage from each capacitor system $C_1$ or $C_2$ is combined to provide $2V_B$, or in this example, a total of 24 V, to the output node 306.

The switches A and C and the controller 304 can also be configured to provide additional control over the level of charge to the first and second capacitor systems $C_1$ and $C_2$. For example, it may be advantageous to maintain the output node 306 to be below a certain maximum threshold. In these scenarios, the switches A and C can be utilized to provide such functionality. In some embodiments, from mode 1 or normal operation, the controller 304 can transition to yet a third mode of operation (mode 3), and open the switches A and C, while maintaining the switch B in an open state, after the first and second capacitor systems $C_1$ and $C_2$ are charged to a first and second predetermined target voltage respectively. In some embodiments the first and second target voltages can be the same voltage. In other embodiments, the first and second target voltages can be different values. As described above, in some embodiments, mode 3 can be activated before the first and second capacitor systems $C_1$ and $C_2$ are charged fully to the battery voltage. The first and second capacitor systems $C_1$ and $C_2$ can be kept on standby mode at this charged level until they are needed during a future period of support, such as support mode 2.

For example, in automotive applications, during mode 1 or normal operation, the controller 304 can transition to operating mode 3, and open the switches A and C, while also maintaining the switch B in an open state, when the first and second capacitor systems $C_1$ and $C_2$ are each charged to 8 V. In this scenario, during mode 2 or voltage support operation, the switch B is closed, and 8 V from each first and second capacitor systems $C_1$ and $C_2$, or a total of 16 V, is available to the output node 306.

Any combination of the switches A, B, C, D and diode $D_1$ and different switch timing strategies can be used without departing from the scope of the present disclosure based on the applications of the energy storage system 600. For example, when the switches A, B, C and D are utilized, the controller 304, can close the switches A, C and D and open the switch B during mode 1 or normal operation. The controller 304 can open the switches A and C, not necessarily simultaneously or in that order, once each capacitor system $C_1$ and $C_2$ has reached its target charge voltage. During mode 2 or voltage support mode, the controller 304 can close the switch B while other switches remain open. In this scenario, the combination of the voltages of the first and second capacitor systems $C_1$ and $C_2$ supports the output node 306. It will be understood that the switches A and C, and the functionality described herein, can be employed in an embodiment similar to FIG. 6, but without the switch D and/or diode $D_1$. Additionally, although the embodiments of the energy storage systems described herein are shown with one or two capacitor systems, the concepts described can be employed within similar, but expanded systems that include more than two capacitor systems, with additional corresponding switches as needed, to provide additional voltage support.

The switches A, B, C and D can be implemented by field effect transistors, for example, MOSFETs, or natural relays and power transistors. Power transistors can be used to better control the ON resistance of the power transistor to provide a smoother voltage profile for the output node. Charging circuits other than resistors can be used instead of the resistors $R_1$ and $R_2$ in the above described embodiments and without departing from the scope of the present disclosure. For example, DC to DC converters or power transistors can be used instead of the resistors $R_1$ and $R_2$.

In various embodiments, a controller, for example the controller 304 can be configured to detect various voltages and currents in the energy storage systems described in order to timely open or close appropriate switches and place the energy storage system in the proper mode of operation. For example, the controller 304 can be configured to detect the voltage or current demand of the output node 306. While not shown, the controller 304 can be configured to detect the voltages of the battery system 302, and each of the first and second capacitor systems $C_1$ and $C_2$ in order to control timely operations of the switches A, B, C and D or other operations of the energy storage systems described herein.

Figure 7:
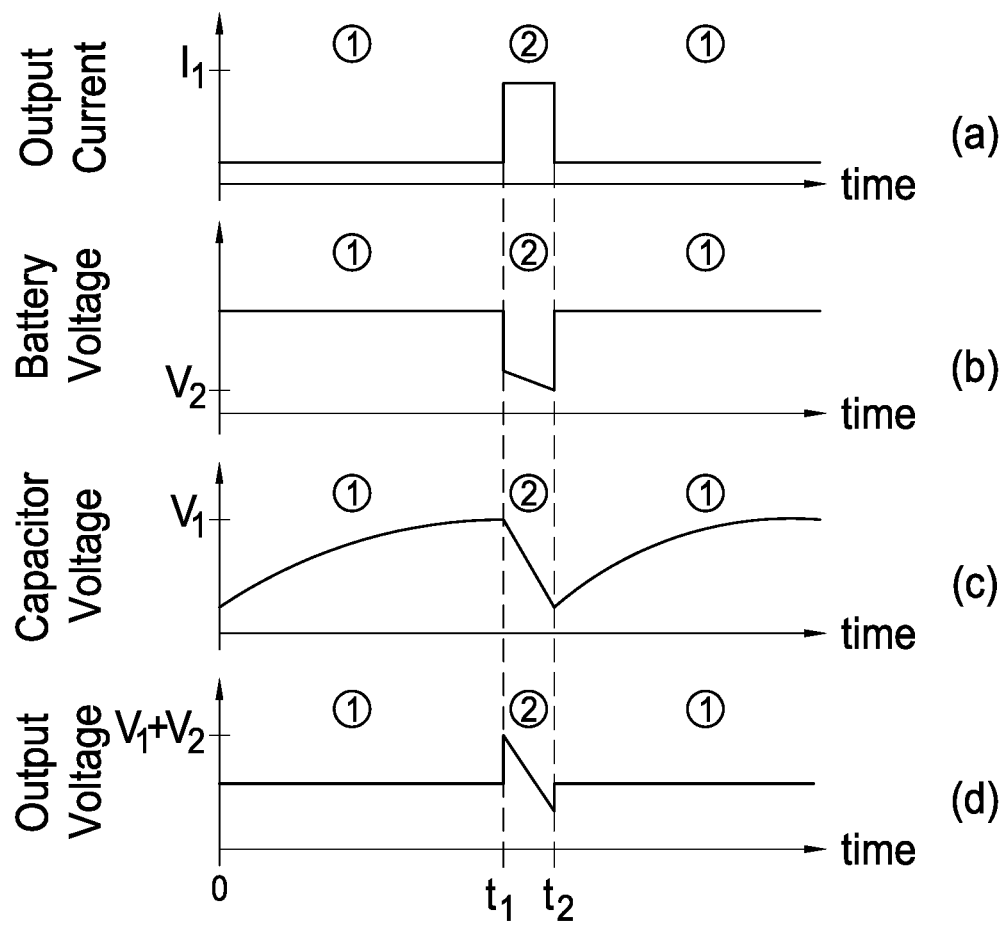
FIG. 7 demonstrates exemplary approximate charge and voltage graphs of embodiments.

FIG. 7 demonstrates exemplary approximate charge and voltage graphs of embodiments of the energy storage systems described above. FIG. 7(a) shows a graph of output current observed at, for example, the output node 306. Between times 0 to $t_1$, the output node 306 does not need voltage support. The energy storage system can therefore be in mode 1 or normal operation mode. FIG. 7(c) is an exemplary graph of the voltage of a capacitor system, for example, the first or the second capacitor system $C_1$ or $C_2$, versus time. During times 0 to $t_1$, the energy storage system is in mode 1 and the capacitor system, for example $C_1$ or $C_2$, is being charged (or maintained at a charge) to a target capacitor voltage $V_1$. The target capacitor output voltage $V_1$ can be the output voltage of a single capacitor, or the combined voltage of two or more capacitors. Additionally, the target capacitor output voltage can correspond to a controlled target capacitor output voltage (that corresponds to active switching of the switches A and C such as that described with reference to FIG. 6), or a default target capacitor output voltage (that does not include such active switching).

As described above, the first and second capacitor systems $C_1$ and $C_2$ can each be charged to a different target voltage, for example $V_1$ and $V_2$ respectively, both can be charged to the same target voltage $V_1$ or they can both be charged to $V_B$, the voltage of the battery system 302. As shown in FIG. 7(a), between times $t_1$ to $t_2$, the output node 306 demands a high current $I_1$. As shown in FIG. 7(b), during times $t_1$ to $t_2$, the voltage of the battery system 302 drops to a low voltage $V_L$. Thus, it can be beneficial to provide the battery system 302 with voltage support during this period, for example, if $V_L$ is at or below a discharge voltage threshold.

At time $t_1$, the controller 306 configures the energy storage system 300 in mode 2 or voltage support. FIG. 7(d) shows the voltage of the output node 306 versus time. During times $t_1$ to $t_2$, the energy storage system is in mode 2 or voltage support and the output node 306 rises to a supported voltage, for example $V_1+V_2$. The voltage of the output node slowly decays from $t_1$ to $t_2$ because the capacitor systems $C_1$ and $C_2$ are discharging into the output node 306. The size of the capacitor systems $C_1$ and $C_2$ and the timing of the switches both in mode 1 and mode 2 operations can be designed to provide enough charge for the period of support, $t_1$ to $t_2$. In the exemplary graphs shown in FIG. 7, from time $t_2$ onward, the demand in high current at the output node 306 is alleviated and the controller 304 can place the energy storage system in mode 1 or normal operation mode and charge the capacitor systems $C_1$ and $C_2$ for a future period of support.

Figure 8:
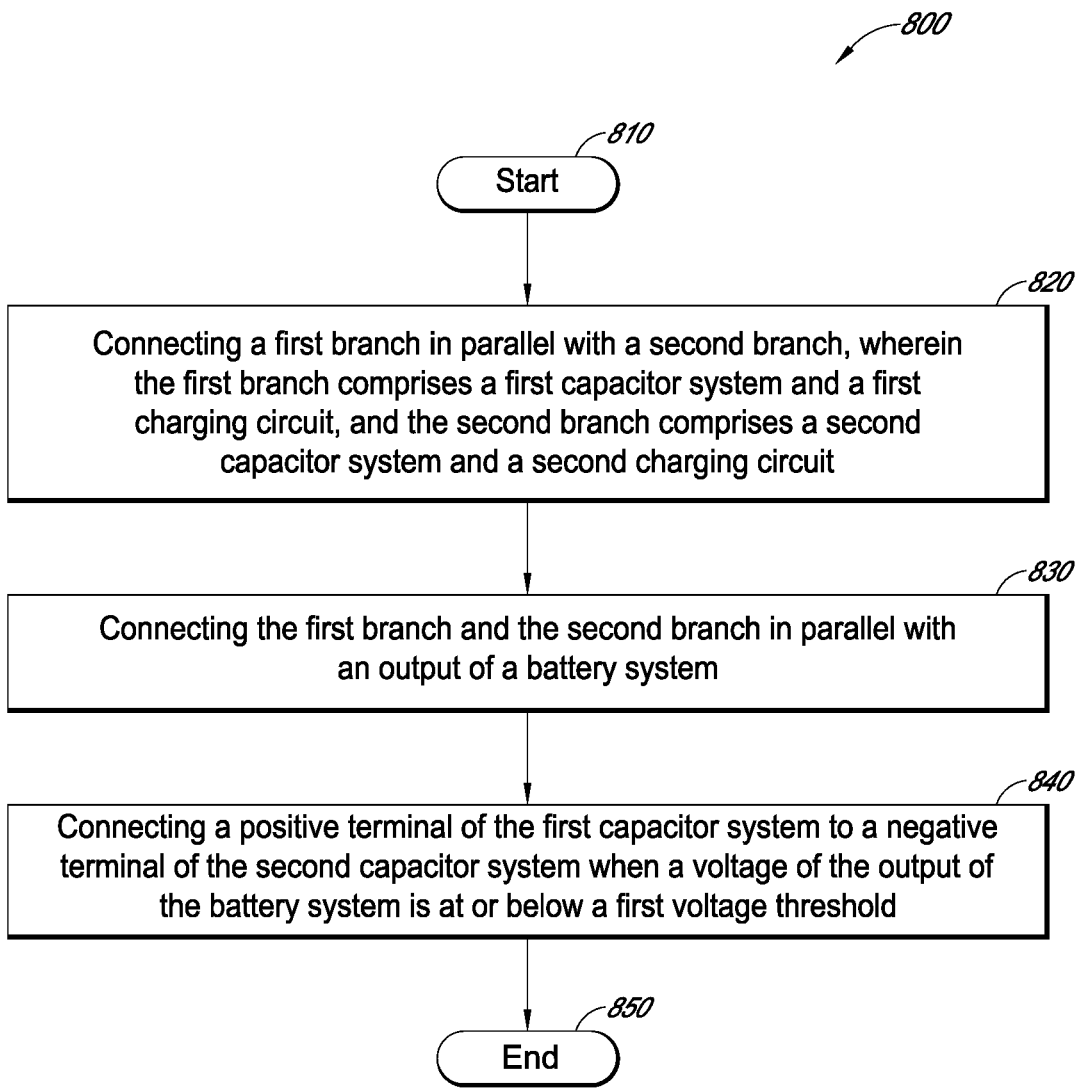
FIG. 8 is a flow diagram illustrating a method of providing voltage support for an output of a battery system according to an embodiment.

FIG. 8 is a flow diagram illustrating a method 800 of providing voltage support for an output of a battery system according to an embodiment. Method 800 can be implemented, for example, using the energy storage system 300 illustrated in FIG. 3. The method 800 starts at block 810. The process then moves to block 820 by connecting a first branch in parallel with a second branch, wherein the first branch comprises a first capacitor system and a first charging circuit, and the second branch comprises a second capacitor system and a second charging circuit. The process then moves to block 830 by connecting the first branch and the second branch in parallel with an output of a battery system. The process then moves to block 840 by connecting a positive terminal of the first capacitor system to a negative terminal of the second capacitor system when a voltage of the output of the battery system is at or below a first voltage threshold. The process subsequently ends at block 850.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, or other device. In the alternative, the processor and the storage medium may reside as discrete components in a user terminal, or other device.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

It will also be understood that although many of the embodiments herein describe the use of various components in combination to form embodiments of a system and method for managing operation of a capacitor system in combination with a battery system, many of the components can be manufactured and provided independently without other components. For example, embodiments of the system and method for managing operation of a capacitor system, and any of the many other components described herein, or any combination thereof, can be provided separately, and/or as a kit. Thus, the invention is not to be limited otherwise.

What is claimed is:

1. An apparatus for providing voltage support for an output of a battery system, comprising:
    a first branch comprising a first capacitor and a first charging circuit, the first charging circuit coupling a positive terminal of the first capacitor to a positive terminal of a battery;
    a second branch comprising a second capacitor and a second charging circuit, the second charging circuit coupling a negative terminal of the second capacitor to ground;
    a third branch comprising the battery, the positive terminal of the battery further coupled to the positive terminal of the second capacitor and an output node, wherein the first and second branches are connected in parallel with one another and the third branch and wherein outputs from the first branch, the second branch, and the third branch are connected to a load through the output node; and
    a controller configured to:
        connect the first capacitor to the first charging circuit via a first switch and connect the second capacitor to the second charging circuit via a second switch;
        disconnect the first capacitor from the first charging circuit via the first switch when a voltage of the first capacitor reaches a first fixed target voltage;
        disconnect the second capacitor from the second charging circuit via the second switch when a voltage of the second capacitor reaches a second fixed target voltage;
        compare a detected voltage of the output of the battery to a first voltage threshold,
        detect a current demand event at the load, and
        connect the positive terminal of the first capacitor to the negative terminal of the second capacitor through the connecting switch in response to (1) a determination that the voltage of the output of the battery is at or below the first voltage threshold and (2) detecting the current demand event at the load such that:
            the first capacitor and the second capacitor are connected in series to the load,
            a sum of the outputs from the series connected first and second capacitors is in parallel with the output from the battery, and
            the series connected first and second capacitors provide voltage support to the battery connected to the load at voltages greater than the voltage of the output of the battery.

2. The apparatus of claim 1 wherein the controller is further configured to disconnect the battery from the load when the first and second capacitors are connected to the load in series via the connecting switch.

3. The apparatus of claim 1 wherein the first fixed target voltage, the second fixed target voltage and a maximum voltage of the output of the battery are approximately equal.

4. The apparatus of claim 1 wherein the controller is further configured to open a blocking circuit switch to block a reverse current from the second capacitor to the battery when the controller connects the first and second capacitors and to close the blocking circuit switch when the controller disconnects the first and second capacitors.

5. The apparatus of claim 1 wherein the first voltage threshold is approximately a maximum discharge voltage threshold of the battery.

6. The apparatus of claim 1 wherein the first and second fixed target voltages are each approximately half of a maximum voltage desired at the output.

7. The apparatus of claim 1 wherein the first charging circuit comprises a first resistor and the second charging circuit comprises a second resistor.

8. A method of providing voltage support from a first capacitor and a second capacitor for an output of a battery, comprising:
    connecting the first capacitor to a first charging circuit via a first switch and connecting the second capacitor to a second charging circuit via a second switch;
    disconnecting the first capacitor from the first charging circuit via the first switch when a voltage of the first capacitor reaches a first fixed target voltage; and
    disconnecting the second capacitor from the second charging circuit via the second switch when a voltage of the second capacitor reaches a second fixed target voltage;
    comparing a detected voltage of the output of the battery to a first voltage threshold, the battery being part of a battery branch and a positive terminal of the battery coupled to a positive terminal of the second capacitor and an output node;
    detecting a current demand event at a load coupled to the output node; and
    connecting a positive terminal of the first capacitor to a negative terminal of the second capacitor in response to (1) a determination that the voltage of the output of the battery is at or below the first voltage threshold and (2) the detecting the current demand event at the load, such that:
        the first capacitor and the second capacitor are connected in series to the load via the output node,
        a sum of outputs from the series connected first and second capacitors is in parallel with the output from the battery, and
        the series connected first and second capacitors provide voltage support to the battery system connected to the load at voltages greater than the voltage of the output of the battery;
    wherein the first capacitor is disposed in a first branch in parallel with a second branch in which the second capacitor is disposed, wherein the first branch comprises the first capacitor and the first charging circuit, the first charging circuit coupling the positive terminal of the first capacitor to the positive terminal of the battery, and wherein the second branch comprises the second capacitor and the second charging circuit, the second charging circuit coupling the negative terminal of the second capacitor to ground.

9. The method of claim 8 wherein the first fixed target voltage, the second fixed target voltage, and a maximum voltage of the output of the battery are approximately equal.

10. The method of claim 8 further comprising disconnecting the battery from the output via a third switch when the controller connects the first and second capacitors.

11. The method of claim 8 wherein the first voltage threshold is approximately a maximum discharge voltage threshold of the battery.

12. The method of claim 11 wherein the first and second fixed target voltages are each approximately half of a maximum voltage desired at the output.

13. The method of claim 8 further comprising opening a blocking circuit switch to cause a diode to block a reverse current from the second capacitor to the battery.

14. An apparatus for providing voltage support for an output of a battery, comprising:
   a first capacitor having a positive terminal;
   a second capacitor having a positive terminal at a same voltage potential as a positive terminal of a battery and a negative terminal;
   a first charging circuit connected between the output of the battery and the positive terminal of the first capacitor, the first capacitor and the first charging circuit forming a first branch;
   a second charging circuit connected between the negative terminal of the second capacitor and ground, the second capacitor and the second charging circuit forming a second branch; and
   a controller configured to:
      connect the first capacitor to the first charging circuit via a first switch and connect the second capacitor to the second charging circuit via a second switch;
      disconnect the first capacitor from the first charging circuit via the first switch when a voltage of the first capacitor reaches a first fixed target voltage;
      disconnect the second capacitor from the second charging circuit via the second switch when a voltage of the second capacitor reaches a second fixed target voltage;
      compare a detected voltage of the output of the battery to a first voltage threshold,
      detect a current demand event at a load, and
      connect the positive terminal of the first capacitor to the negative terminal of the second capacitor in response to (1) a determination that the voltage of the output of the battery is at or below the first voltage threshold and (2) detecting the current demand event at the load, such that:
      the first capacitor and the second capacitor are connected in series to the load,
      a sum of the outputs from the series connected first and second capacitors is in parallel with the output from the battery, and
      the series connected first and second capacitors provide voltage support to the battery connected to the load at voltages greater than the voltage of the output of the battery.

15. The apparatus of claim 14, wherein the controller is further configured to connect the positive terminal of the first capacitor to the negative terminal of the second capacitor and open the first and second switches when the voltage of the output of the battery is at or below a first voltage threshold.

16. The apparatus of claim 14, wherein the controller is further configured to open a blocking circuit switch to block a reverse current from the second capacitor to the battery when the controller connects the positive terminal of the first capacitor to the negative terminal of the second capacitor.

17. The apparatus of claim 14 wherein the first and second charging circuits comprise resistors.

* * * * *